(12) United States Patent
Lu et al.

(10) Patent No.: US 11,103,956 B2
(45) Date of Patent: Aug. 31, 2021

(54) DOUBLE-SIDE SYNCHRONOUS LASER SHOCK PEENING METHOD FOR LEADING EDGE OF TURBINE BLADE

(71) Applicant: JIANGSU UNIVERSITY, Jiangsu (CN)

(72) Inventors: Jinzhong Lu, Jiangsu (CN); Haifei Lu, Jiangsu (CN); Kaiyu Luo, Jiangsu (CN); Liujun Wu, Jiangsu (CN); Changyu Wang, Jiangsu (CN)

(73) Assignee: JIANGSU UNIVERSITY

( * ) Notice: Subject to any disclaimer, the term of this patent is extended or adjusted under 35 U.S.C. 154(b) by 248 days.

(21) Appl. No.: 16/068,092

(22) PCT Filed: Mar. 29, 2017

(86) PCT No.: PCT/CN2017/078518
§ 371 (c)(1),
(2) Date: Jul. 3, 2018

(87) PCT Pub. No.: WO2018/141128
PCT Pub. Date: Aug. 9, 2018

(65) Prior Publication Data
US 2021/0205930 A1   Jul. 8, 2021

(30) Foreign Application Priority Data

Feb. 6, 2017   (CN) .......................... 201710065820.2

(51) Int. Cl.
*B23K 26/356*   (2014.01)
*B23K 26/06*    (2014.01)
(Continued)

(52) U.S. Cl.
CPC ........ *B23K 26/356* (2015.10); *B23K 26/0619* (2015.10); *B23K 26/0622* (2015.10);
(Continued)

(58) Field of Classification Search
CPC .............. B23K 26/073; B23K 26/0622; B23K 26/0626; B23K 26/18; B23K 26/146;
(Continued)

(56) References Cited

U.S. PATENT DOCUMENTS

| 5,951,790 A | * | 9/1999 | Mannava | .................. | C21D 1/54 |
| | | | | | 148/510 |
| 2003/0042235 A1 | * | 3/2003 | Won Suh | ............... | B23K 26/00 |
| | | | | | 219/121 |
| 2008/0078477 A1 | * | 4/2008 | Bailey | ...................... | C21D 7/06 |
| | | | | | 148/421 |

FOREIGN PATENT DOCUMENTS

| CN | 103205545 | 7/2013 |
| CN | 103255268 | 8/2013 |

(Continued)

OTHER PUBLICATIONS

International Preliminary Report on Patentability issued in PCT/CN2017/078518, dated Aug. 6, 2019, 5 pages.
(Continued)

*Primary Examiner* — Robert J Utama
*Assistant Examiner* — Rachel R Rizzo
(74) *Attorney, Agent, or Firm* — Hayes Soloway P.C.

(57) ABSTRACT

A double-side synchronous laser shock peening (LSP) method for leading edges of turbine blades employs two laser beams with the same diameter and different pulse energy to synchronously shock the front and back sides of each point within 8-10 mm range of the leading edge of the blade, wherein the laser pulse energy on the front side is greater than the laser pulse energy on the back side, and wherein, the laser power density on the front side is used to generate dynamic plastic deformation on the entire laser-shock spot area, while the laser power density on the back side is used to balance off excessive shock-wave pressure in the central area of laser-shock spot on the front side and
(Continued)

avoid macroscopic deformation of the blade in the central area of laser-shock spot on the front side, and an optimal strengthening effect is achieved finally.

13 Claims, 2 Drawing Sheets

(51) Int. Cl.
| | | |
|---|---|---|
| *B23K 26/0622* | (2014.01) | |
| *B23K 26/146* | (2014.01) | |
| *B23K 103/14* | (2006.01) | |
| *B23K 101/00* | (2006.01) | |
| *B23K 103/04* | (2006.01) | |
| *B23K 103/10* | (2006.01) | |

(52) U.S. Cl.
CPC ...... *B23K 26/146* (2015.10); *B23K 2101/001* (2018.08); *B23K 2103/05* (2018.08); *B23K 2103/10* (2018.08); *B23K 2103/14* (2018.08)

(58) Field of Classification Search
CPC ............ B23K 26/0732; B23K 26/3576; B23K 26/356; B23K 26/03; B23K 26/082; B23K 26/0861; B23K 26/0738; B23K 26/1464; B23K 26/1462; B23K 26/0604; B23K 26/0608; B23K 26/067; B23K 26/02; B23K 26/1476; B23K 26/0619; B23K 2103/10; B23K 2101/001; B23K 2103/05; B23K 2103/14; C21D 1/09; C21D 10/005; C21D 7/06; C21D 10/00; C21D 11/005; C21D 9/0068; B24C 1/10; B05B 12/122; G01N 29/045; C22F 1/183; C22F 1/04; C22F 1/10; F01D 5/286; F01D 5/288

See application file for complete search history.

(56) References Cited

FOREIGN PATENT DOCUMENTS

| | | |
|---|---|---|
| CN | 103320579 | 9/2013 |
| CN | 104862468 | 8/2015 |
| EP | 2386661 | 11/2011 |

OTHER PUBLICATIONS

International Search Report and Written Opinion issued in PCT/CN2017/078518, dated Jun. 9, 2017, with English translation, 14 pages.

* cited by examiner

DOUBLE-SIDE SYNCHRONOUS LASER SHOCK PEENING METHOD FOR LEADING EDGE OF TURBINE BLADE

I. TECHNICAL FIELD

The present invention relates to the technical field of surface engineering and laser processing, in particular to a double-side synchronous laser shock peening (LSP) method for leading edge of turbine blade.

II. BACKGROUND ART

Laser shock peening (LSP) is a new surface peening technology, which mainly irradiates metal surface with laser having short pulses (tens of nanoseconds) and high-peak power density (>109 W/cm$^2$), the laser beam is absorbed by an absorption layer after passing through a confinement layer, and thereby the absorption layer obtains energy and undergoes explosive gasification and evaporation, and produces high-temperature and high-pressure plasma; due to confinement of the outer confinement layer, the plasma forms a high-pressure shock wave, which is propagated into the material, plastic deformation occurs on the surface layer of the material under a force effect of the shock wave, so that the microstructure of the material in the surface layer is changed, and compressive residual stress is generated in the shocked area at the same time, so as to improve the strength, hardness, wear resistance and stress corrosion resistance properties of the material. LSP is mainly used to improve fatigue strength of key portions of key components of aircraft engines.

Turbine blade is one of important components of an engine, and has characteristics including complex structure, large varieties, large quantity, strong influence on engine performance and long design and manufacturing cycle, etc. Turbine blades are usually subjected to high operating stress and high operating temperature, and the stress and temperature vary frequently and sharply. In addition, due to corrosion and abrasion problems, the requirement for the operating conditions is very rigorous. Therefore, the surface performance of turbine blades must be improved to prolong the service life of aircraft turbine blades. Usually, double-side synchronous LSP is employed for strengthening the front and back sides of turbine blades at the international level, i.e., LSP is applied to the front and back sides of a certain point of turbine blade with the same process parameters (including pulse width, pulse energy, and spot diameter). However, with such a method, high tensile residual stress may be produced in the central part of the blade, and the entire leading edge of the blade may be strengthened non-uniformly. It is a blade strengthening method that single side of the blade is shocked. Since the pulsed laser is in Gaussian distribution, a desired strengthening effect is not achieved in the edge area of the spot when the strengthening effect has been achieved in the central area of the spot; the energy in the central area of the spot may be too high which will cause macroscopic deformation and damage of the blade when a desired strengthening effect is achieved in the edge area of the spot. Consequently, an optimal strengthening effect can't be achieved.

III. CONTENTS OF THE INVENTION

To solve the above-mentioned problems, the present invention provides a double-side synchronous laser shock peening (LSP) method for a leading edge of turbine blade, that is, two laser beams with the same diameter and different pulse energy are synchronously applied to shock the front and back sides of each point within 8-10 mm range of the leading edge of the blade, and the laser pulse energy on the front side is greater than the laser pulse energy on the back side, wherein, the laser power density on the front side is used to generate dynamic plastic deformation on the entire laser-shock spot area, while the laser power density on the back side is used to balance off excessive shock-wave pressure in the central area of laser-shock spot on the front side and avoid macroscopic deformation of the blade in the central area of laser-shock spot on the front side.

The specific steps are as follows: the turbine blade is fixed with fixtures, flowing water is used as a confinement layer, and the Hugoniot elastic limit $$\sigma_H = \sigma_Y^{dyn} \frac{(1-v)}{(1-2v)}$$

of the material is calculated according to the dynamic yield strength $\sigma_Y^{dyn}$ of the material, where, v is the Poisson's ratio of the material, wherein, the spot of laser at each shock point on the front side of the blade and the corresponding spot of laser at each shock point on the back side of the blade are in a straight line perpendicular to the surface of the blade by means of a positioning device, and the front and back sides are shocked synchronously by two laser beams by means of a laser control system. Overlapped LSP is applied at laser power density $I_1$ to the front side of the leading edge of turbine blade, wherein $$I_1 = \frac{4E_1}{\tau \pi d^2},$$

where, $E_1$ is laser pulse energy of LSP on the front side, z is laser pulse width, d is spot diameter; peak pressure on the front side $$P_1 = 0.01 \sqrt{\frac{\alpha Z I_1}{2\alpha + 3}}$$

is obtained according to Gaussian distribution law of circular spot and a peak pressure calculation formula, where, $\alpha$ is plasma-material interaction coefficient, Z is equivalent acoustic impedance, $I_1$ is laser power density; the pressure in the edge area of the spot on the front side is $$P_2 = P_1(t)\exp\left(\frac{-R^2}{2R^2}\right) = P_1(t)e^{-\frac{1}{2}},$$

where, $P_1(t)$ is peak pressure on the front side, and R is the spot diameter. According to $$P_1 = K_F \frac{2t_1}{d} \sigma_Y^{dyn},$$

where, $K_F$ is a coefficient and is usually 1.1, $t_1$ is thickness of the material, d is spot diameter, and $\sigma_Y^{dyn}$ is dynamic yield strength of the material, it can be obtained that the thickness $t_0$ of the material must meet $0<t_0 \le t_1$. A laser power density $I_2$ on the back side of the leading edge of turbine blade is used to balance off the excessive shock wave pressure in the central area of the laser-shock spot on the front side, wherein, $$I_2 = \frac{4E_2}{\tau \pi d^2},$$

where, $E_2$ is laser pulse energy for LSP on the back side, $\tau$ is laser pulse width, d is spot diameter; peak pressure on the back side $$P_3 = 0.01 \sqrt{\frac{\alpha Z I_2}{2\alpha + 3}}$$

is obtained according to Gaussian distribution law of circular spot and a peak pressure calculation formula, where, $\alpha$ is plasma-material interaction coefficient, Z is equivalent acoustic impedance, and $I_2$ is laser power density; the pressure in the edge area of the spot on the back side is $$P_4 = P_2(t) \exp\left(\frac{-R^2}{2R^2}\right) = P_2(t) e^{-\frac{1}{2}},$$

where, $P_2(t)$ is peak pressure on the back side, and R is spot diameter. Wherein, $$P_3 = \sqrt{\frac{E_2}{E_1}} P_1,$$

where, $E_1$ is laser pulse energy of LSP on the front side, $E_2$ is laser pulse energy of LSP on the back side, and $P_1$ is peak pressure on the front side; in order to generate dynamic plastic deformation in the entire laser-shock spot area while preventing macroscopic deformation of the blade in the central area of the spot, the following conditions must be met: $P_1 > 2.5\sigma_H$, $2\sigma_H \le P_1 - P_3 \le 2.5\sigma_H$, and $P_2 - P_4 \ge \sigma_H$.

The material of the turbine blade is aluminum alloy, stainless steel, titanium alloy or nickel-based alloy.

The LSP path is in a reciprocating linear shape; the spot of laser is in a circular shape, the LSP parameters are as follows: spot diameter is 3 mm; pulse width is 8-30 ns; pulse energy is 2-15 J, overlapping rate in transverse direction and longitudinal direction is 50%.

The intensity of laser is in Gaussian distribution, the space-time distribution of the pressure pulse is expressed with the following quasi-Gaussian formula:

$$P(x, y, t) = P(t) \exp\left[\frac{-(x^2 + y^2)}{2R^2}\right],$$

where, x and y are surface coordinates, and R is spot diameter.

The present invention has the following beneficial effects: a higher laser power density is used on the front side of the leading edge of turbine blade for overlapped LSP, while avoiding macroscopic deformation and damage of the blade in the central area of the spot, and finally an optimal strengthening effect is achieved.

IV. DESCRIPTION OF DRAWINGS

To describe the technical schemes in the examples of the present application or the prior art, hereunder the accompanying drawings necessary for describing the examples or the prior art will be introduced briefly.

Table 1 compares the results of vibration fatigue tests of turbine blade in different states.

In the figures: 1, 2, 5—laser beam; 3—turbine blade; 4—spray tube

V. EMBODIMENTS

Hereunder the embodiments of the present invention will be described in detail with reference to the accompanying drawings and examples, but the present invention should not be limited to those examples.

In the present invention, a TC4 titanium alloy turbine blade is utilized. The major mechanical properties of the material include: density: 4.5 g·cm$^{-3}$; dynamic yield strength: 1.43 GPa; Poisson's ratio: 0.3; water resistance: 1.14×10$^6$ g·cm$^{-2}$·s$^{-1}$; acoustic impedance: 2.75×10$^6$ g·cm$^{-2}$·s$^{-1}$.

$$\sigma_H = \sigma_Y^{dyn} \frac{1-v}{1-2v} = 1430 \times \frac{1-0.3}{1-2\times 0.3} = 2502.5 \ MPa$$

Example 1

One side of the leading edge of a turbine blade is shocked with pulse laser which has laser pulse width $\tau=10$ ns, laser pulse energy E=12 J, and spot diameter d=3 mm, and vibration fatigue test is carried out for the blade after laser shock peening (LSP).

Example 2

The front and back sides of each point of the leading edge of a turbine blade are shocked synchronously with two laser beams in the same diameter and same pulse energy, wherein, the laser pulse width is $\tau=10$ ns, the laser pulse energy is E=12 J, the spot diameter is d=3 mm, and vibration fatigue test is carried out for the blade after LSP.

Example 3

Figure 1:
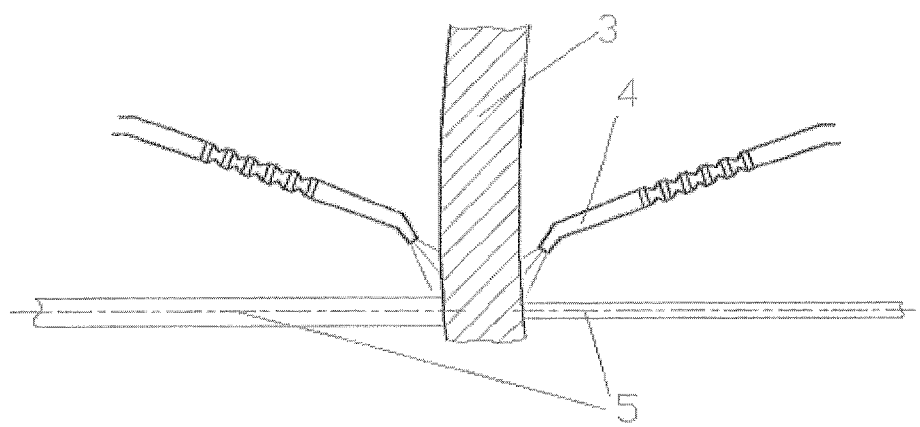
FIG. 1 is a schematic diagram of overall laser shock peening (LSP) on a turbine blade.
Figure 2:
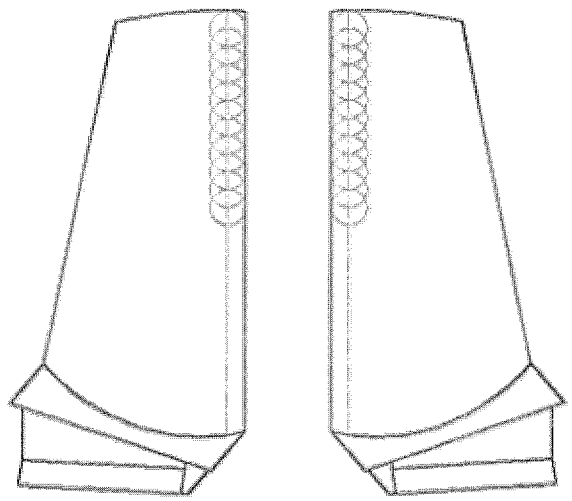
FIG. 2 is a schematic diagram of LSP on the leading edge of turbine blade.

According to the technical scheme described in the present invention, the front and back sides of each point of the leading edge of a turbine blade are shocked with two laser beams having the same diameter but different pulse energy. FIGS. 1 and 2 are schematic diagrams of overall LSP on the turbine blade and LSP on the leading edge of the turbine blade respectively. By means of a positioning device, the spot of laser at each shock point on the front side of the blade and the spot of laser at each corresponding shock point on the back side of the blade are in a straight line perpendicular to the surface of the blade. The front and back sides are shocked synchronously by two laser beams by means of a laser control system. On the front side of the leading edge of the turbine blade, the laser pulse width is τ=10 ns, the laser pulse energy is $E_1$=12 J, and the spot diameter is d=3 mm; on the back side of the leading edge of the turbine blade, the laser pulse width is τ=10 ns, the laser pulse energy is $E_2$=2 J, and the spot diameter is d=3 mm.

$$P_1 = 0.01\sqrt{\frac{\alpha Z I_1}{2\alpha+3}} = 0.01 \times \sqrt{\frac{0.1}{2\times 0.1+3}} \times$$

$$\sqrt{1.61\times 10^6} \times \sqrt{\frac{4\times 12}{(10\times 10^9)\times \pi \times 0.3^2}\times 10^{-9}} = 9.24 \; GPa$$

Where, $P_1 = K_F \frac{2t_1}{d}\sigma_Y^{dyn}$, i.e., $9.24 = 1.1\times \frac{2t_1}{3}\times 1.43$, then $t_1 = 8.8$ mm, i.e., $0 < t_0 \leq 8.8$ mm $$P_2 = P_1(t)\exp\left(\frac{-R^2}{2R^2}\right) = 9.24\times e^{-\frac{1}{2}} = 5.60 \; GPa$$

$$P_3 = 0.01\sqrt{\frac{\alpha Z I_2}{2\alpha+3}} = 0.01 \times \sqrt{\frac{0.1}{2\times 0.1+3}} \times \sqrt{1.61\times 10^6} \times$$

$$\sqrt{\frac{4\times 2}{(10\times 10^{-9})\times \pi \times 0.3^2}\times 10^{-9}} = 3.77 \; GPa$$

$$P_4 = P_3(t)\exp\left(\frac{-R^2}{2R^2}\right) = 3.77\times e^{-\frac{1}{2}} = 2.29 \; GPa$$

Figure 3:
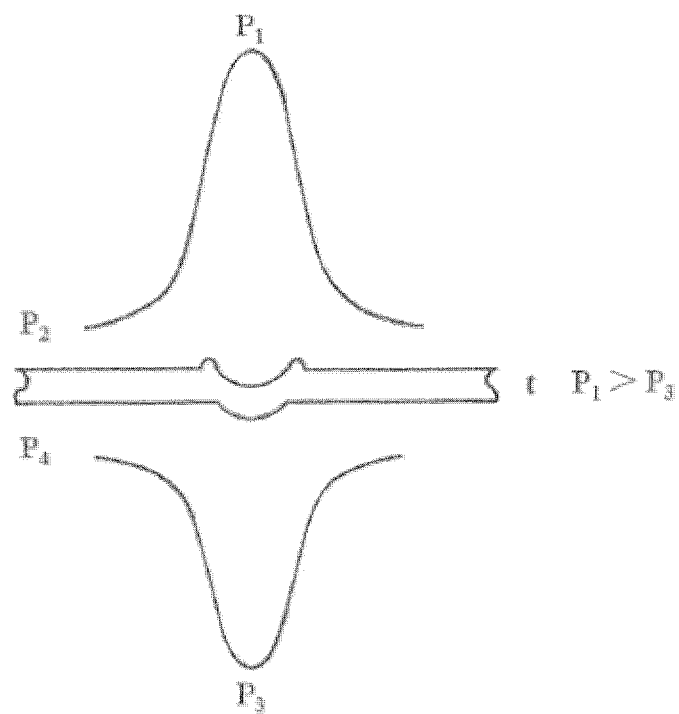
FIG. 3 is a schematic diagram of double-side LSP.
Figure 4:
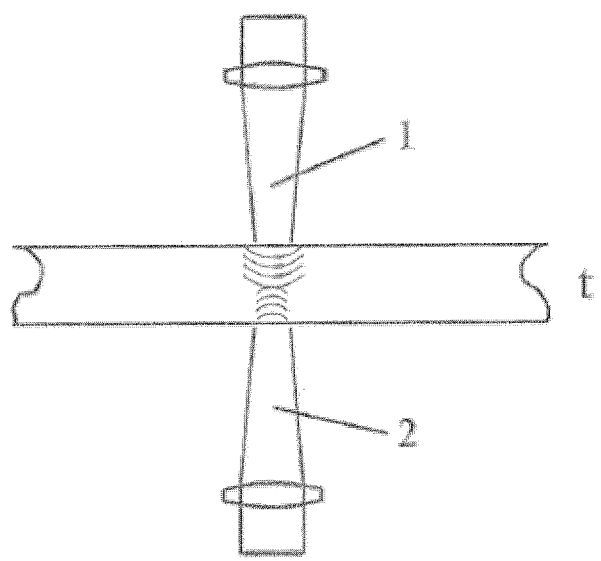
FIG. 4 is a distribution diagram of shock wave at the center of the sample.

FIGS. 3 and 4 are a schematic diagram of double-side LSP and a distribution diagram of shock wave at the center of the sample, respectively. In order to generate dynamic plastic deformation in the entire laser-shock spot area while preventing macroscopic deformation of the blade in the central area of the spot, the following conditions must be met: $P_1>2.5\sigma_H$, $2\sigma_H \leq P_1-P_3 \leq 2.5\sigma_H$ and $P_2-P_4 \geq \sigma_H$. Then, a vibration fatigue test is carried out for the blade after LSP.

It is seen from Table 1 that: through vibration fatigue life tests in four different states, i.e., as-machined (1-1, 1-2), single-side LSP (2-1, 2-2), double-side synchronous LSP with two laser beams having the same diameter and same pulse energy (3-1, 3-2), and double-side synchronous LSP with two laser beams having the same diameter and different pulse energy (4-1, 4-2), under different stress conditions (430 MPa and 560 MPa), the result indicates that the fatigue life of the turbine blade shocked on both sides with two laser beams having the same diameter and different pulse energy is obviously improved and meets the conditions $P_1 \geq 2.5\sigma_H$, $2\sigma_H \leq P_1-P_3 \leq 2.5\sigma_H$ and $P_2-P_4 \geq \sigma_H$, and finally an optimal strengthening effect is achieved while no macroscopic deformation or damage of the blade is produced in the central area of the spot.

TABLE 1

| State | Stress/MPa | Fatigue life |
|---|---|---|
| 1-1 (as-machined) | 430 | 2.49 × 10⁷ |
| 1-2 (as-machined) | 560 | 1.23 × 10⁷ |
| 2-1 (example 1) | 430 | 3 × 10 |
| 2-2 (example 1) | 560 | 2.49 × 10⁷ |
| 3-1 example 2 | 430 | 3.26 × 10⁷ |
| 3-2 (example 2) | 560 | 2.86 × 10⁷ |
| 4-1 (example 3) | 430 | 3.51 × 10⁷ |
| 4-2 (example 3) | 560 | 3.05 × 10⁷ |

The invention claimed is:

1. A double-side synchronous laser shock peening (LSP) method for strengthening a leading edge of turbine blade, comprising simultaneously using two laser beams with a same diameter and different pulse energy to shock front and back sides of each point within 8-10 mm range of the leading edge of the blade, wherein the laser pulse energy on the front side is greater than the laser pulse energy on the back side, and wherein, the laser power density on the front side is generates dynamic plastic deformation on the entire laser-shock spot area, while the laser power density on the back side is used to balance off excessive shock-wave pressure in the central area of laser-shock spot on front side and avoid macroscopic deformation of the blade in the central area of laser-shock spot on the front side, whereupon an strengthening effect is achieved.

2. The double-side synchronous LSP method according to claim 1, comprising the following specific steps: (1) the turbine blade is fixed with fixtures; (2) flowing water is used as a confinement layer, wherein, the spot of laser at each shock point on the front side of the blade and the corresponding spot of laser at each shock point on the back side of the blade are in a straight line perpendicular to the surface of the blade by a positioning device; (3) the front and back sides are shocked synchronously by two laser beams by a laser control system; and (4) the leading edge of the turbine blade is shocked on two sides synchronously by two pulse lasers with different laser power density $I_1$ and $I_2$.

3. The double-side synchronous LSP method of claim 1, wherein: peak pressures on the front and the back sides are $P_1$ and $P_3$ respectively; pressures in the edge area of spot on the front and the back sides are $P_2$ and $P_4$ respectively; and, in order to generate dynamic plastic deformation in the entire laser-shock spot area while preventing macroscopic deformation of the blade in the central area of the spot, the following conditions are met: $P_1>2.5\sigma_H$, $2\sigma_H \leq P_1-P_3 \leq 2.5\sigma_H$ and $P_2-P_4 \geq \sigma_H$, where, $\sigma_H$ is Hugoniot elastic limit of the material of the turbine blade.

4. The double-side synchronous LSP method of claim 2, wherein: peak pressures on the front and the back sides are $P_1$ and $P_3$ respectively; pressures in the edge area of spot on the front and the back sides are $P_2$ and $P_4$ respectively; and, in order to generate dynamic plastic deformation in the entire laser-shock spot area while preventing macroscopic deformation of the blade in the central area of the spot, the following conditions are met: $P_1>2.5\sigma_H$, $2\sigma_H \leq P_1-P_3 \leq 2.5\sigma_H$ and $P_2-P_4 \geq \sigma_H$, where, $\sigma_H$ is Hugoniot elastic limit of the material of the turbine blade.

5. The double-side synchronous LSP method according to claim 1, wherein the turbine blade is formed of an aluminum alloy, stainless steel, a titanium alloy or a nickel-based alloy; and the Hugoniot elastic limit of the material of the turbine blade is defined as $$\sigma_H = \sigma_Y^{dyn}\frac{(1-v)}{(1-2v)},$$

where, ν is the Poisson's ratio the material of the turbine blade, and $\sigma_Y^{dyn}$ is dynamic yield strength.

6. The double-side synchronous LSP method according to claim 1, wherein the LSP path is in a reciprocating linear shape; the laser-shock spot is in a circular shape, the LSP parameters are as follows: spot diameter is 3 mm; pulse width is 8-30 ns; pulse energy is 2-15 J; and overlapping rate in transverse direction and longitudinal direction is 50%.

7. The double-side synchronous LSP method according to claim 2, wherein the LSP path is in a reciprocating linear shape; the laser-shock spot is in a circular shape, the LSP parameters are as follows: spot diameter is 3 mm; pulse width is 8-30 ns; pulse energy is 2-15 J; and overlapping rate in transverse direction and longitudinal direction is 50%.

8. The double-side synchronous LSP method according to claim 1, wherein overlapped LSP is applied at laser power density $I_1$ to the front side of the leading edge of turbine blade, wherein $$I_1 = \frac{4E_1}{\tau \pi d^2},$$

where, $E_1$ is laser pulse energy of LSP on the front side, $\tau$ is laser pulse width, d is spot diameter; a laser power density $I_2$ on the back side of the leading edge of turbine blade is used to balance off the excessive shock wave pressure in the central area of the laser-shock spot on the front side, wherein, $$I_2 = \frac{4E_2}{\tau \pi d^2},$$

and wherein, $E_2$ is laser pulse energy of LSP on the back side, $\tau$ is laser pulse width, d is spot diameter.

9. The double-side synchronous LSP method according to claim 2, wherein overlapped LSP is applied at laser power density $I_1$ to the front side of the leading edge of turbine blade, wherein $$I_1 = \frac{4E_1}{\tau \pi d^2},$$

where, $E_1$ is laser pulse energy of LSP on the front side, $\tau$ is laser pulse width, d is spot diameter; a laser power density $I_2$ on the back side of the leading edge of turbine blade is used to balance off the excessive shock wave pressure in the central area of the laser-shock spot on the front side, wherein, $$I_2 = \frac{4E_2}{\tau \pi d^2},$$

and wherein, $E_2$ is laser pulse energy of LSP on the back side, $\tau$ is laser pulse width, d is spot diameter.

10. The double-side synchronous LSP method according to claim 3, wherein, peak pressure on the front side $$P_1 = 0.01 \sqrt{\frac{\alpha Z I_1}{2\alpha + 3}}$$

is obtained according to a Gaussian distribution law of circular spot and a peak pressure calculation formula, where, $\alpha$ is plasma-material interaction coefficient, Z is equivalent acoustic impedance, $I_1$ is laser power density; the pressure in the edge area of the spot on the front side is $$P_2 = P_1(t)\exp\left(\frac{-R^2}{2R^2}\right) = P_1(t)e^{-\frac{1}{2}},$$

wherein, $P_1(t)$ is peak pressure on the front side, and R is the spot diameter; peak pressure on the back side $$P_3 = 0.01 \sqrt{\frac{\alpha Z I_2}{2\alpha + 3}}$$

is obtained according to Gaussian distribution law of circular spot and a peak pressure calculation formula, where, $\alpha$ is plasma-material interaction coefficient, Z is equivalent acoustic impedance, and $I_2$ is laser power density; the pressure in the edge area of the spot on the back side is $$P_4 = P_2(t)\exp\left(\frac{-R^2}{2R^2}\right) = P_2(t)e^{-\frac{1}{2}},$$

where, $P_2(t)$ is peak pressure on the back side, and R is spot diameter, wherein, $$P_3 = \sqrt{\frac{E_2}{E_1}} P_1,$$

and wherein, $E_1$ is laser pulse energy of LSP on the front side, $E_2$ is laser pulse energy of LSP on the back side, and $P_1$ is peak pressure on the front side.

11. The double-side synchronous LSP method according to claim 2, wherein, $\alpha$ is the plasma-material interaction coefficient which is an empirical coefficient and is 0.1~0.25;

$$Z = \frac{2Z_1 Z_2}{Z_1 + Z_2},$$

wherein, $Z_1$ is acoustic impedance of the target material, and $Z_2$ is the acoustic impedance of the confinement layer.

12. The double-side synchronous LSP method according to claim 1, wherein a relation between the shock-wave pressure required for macroscopic deformation of the material of the turbine blade and the thickness $t_0$ and dynamic yield strength $\sigma_Y^{dyn}$ of the material of the turbine blade is $$P = K_F \frac{2t_0}{d} \sigma_Y^{dyn},$$

where, $K_F$ is a coefficient and is 1.1, $t_0$ is thickness of the material of the turbine blade (mm), $\sigma_Y^{dyn}$ is dynamic yield strength of the material (GPa), and d is spot diameter.

13. The double-side synchronous LSP method according to claim 1, wherein the intensity of laser is in Gaussian distribution, the space-time distribution of the laser pulse energy is expressed with the following quasi-Gaussian formula:

$$P(x, y, t) = P(t)\exp\left[\frac{-(x^2 + y^2)}{2R^2}\right],$$

where, x and y are surface coordinates, and R is spot diameter.

* * * * *